(12) United States Patent
Isokawa et al.

(10) Patent No.: US 7,493,764 B2
(45) Date of Patent: Feb. 24, 2009

(54) ELECTRIC POWER GENERATION/HYDROGEN PRODUCTION COMBINATION PLANT

(75) Inventors: Katsushi Isokawa, Kanagawa (JP); Kazuo Hisajima, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 309 days.

(21) Appl. No.: 11/423,273

(22) Filed: Jun. 9, 2006

(65) Prior Publication Data

US 2007/0000251 A1    Jan. 4, 2007

(30) Foreign Application Priority Data

Jun. 30, 2005    (JP)    ............................... 2005-191063

(51) Int. Cl.
  *F01K 7/34*    (2006.01)
(52) U.S. Cl. .......................................... 60/653; 60/655
(58) Field of Classification Search ................ 60/644.1, 60/653, 655, 679–680
See application file for complete search history.

(56) References Cited

U.S. PATENT DOCUMENTS

| | | | | |
|---|---|---|---|---|
| 4,413,348 A | * | 11/1983 | Kapich | .................. 376/367 |
| 5,360,679 A | * | 11/1994 | Buswell et al. | ................. 429/19 |
| 6,824,575 B1 | * | 11/2004 | Otomo et al. | ................... 48/77 |
| 7,278,267 B2 | * | 10/2007 | Yamada et al. | ................. 60/775 |
| 2005/0210881 A1 | * | 9/2005 | Balan et al. | .................... 60/780 |
| 2005/0229603 A1 | * | 10/2005 | Yamada et al. | ................. 60/775 |

FOREIGN PATENT DOCUMENTS

JP    2004-224661    8/2004

\* cited by examiner

*Primary Examiner*—Hoang M Nguyen
(74) *Attorney, Agent, or Firm*—Oblon, Spivak, McClelland, Maier & Neustadt, P.C.

(57) ABSTRACT

An electric power generation/hydrogen production combination plant comprises a feed water pump, a feed water heater arranged upstream relative to the feed water pump to heat feed water, a reformer for producing formation gas containing hydrogen by processing at least one raw material selected from the group consisting of methanol, ethanol and dimethylether, using steam, an intermediate loop for circulating a thermal medium in order to supply the heat of steam generated by a steam generator to the reformer, an intermediate heat exchanger for transmitting the heat of the steam by way of the intermediate loop and a heating outlet pipe of intermediate heat exchanger connected to the heating outlet of the intermediate heat exchanger and the feed water heater to heat feed water.

18 Claims, 5 Drawing Sheets

ELECTRIC POWER GENERATION/HYDROGEN PRODUCTION COMBINATION PLANT

CROSS REFERENCE OF RELATED APPLICATION

This application is based upon and claims the benefit of priority from the prior Japanese Patent Application No. 2005-191063 filed on Jun. 30, 2005; the entire content of which is incorporated herein by reference.

FIELD OF THE INVENTION

This invention relates to an electric power generation/hydrogen production combination plant that can improve the efficiency of the turbines of the plant by producing hydrogen and generating electric power in response to the need thereof.

BACKGROUND

Generally, electric power generation/hydrogen production combination plants that operate to concurrently generate electric power and produce hydrogen are known (See, inter alia, Jpn. Pat. Appln. Laid-Open Publication No. 2004-224661).

Such a known electric power generation/hydrogen production combination plant will be described by referring to FIG. 5.

As shown in FIG. 5, the steam produced from a steam generator 1 of an electric power generation system 22, which may typically be a boiling water reactor, is supplied to a high pressure turbine 24 by way of a main steam pipe 15 to drive the high pressure turbine 24 to rotate and then led to a low pressure turbine 26 to drive by turn the low pressure turbine 26 to rotate in order to drive a generator 3 to rotate and generate electric power.

The steam that has worked in the high pressure and low pressure turbines 24, 26 is condensed back to liquid water by a condenser 4 and its pressure is raised by a condenser pump 5. Then, the water is heated by a low-pressure feed water heater 6 and its pressure is raised further by a feed water pump 7. Thereafter, the water is heated by a high-pressure feed water heater 2 and returned to the steam generator 1 by a feed water pipe 18 to circulate. In actual plant, the some high-pressure feed water heaters 2, the some condenser pumps 5, the some low-pressure feed water heaters 6 and the some feed water pumps 7 are arranged, according to the size of plant. The feed water heaters 2, 6 are arranged upstream and downstream relative to the feed water pump 7 to heat feed water.

The steam that goes out of the high-pressure turbine 24 is partly led to an intermediate heat exchanger 8 by way of heating inlet pipe 16 of intermediate heat exchanger 8. As the intermediate heat exchanger 8 operates to exchange heat, heat is transferred by way of an intermediate loop 19. The heat is then used to heat a reformer 9 for producing hydrogen in hydrogen production plant 23.

On the other hand, the steam that is used to exchange heat in the intermediate heat exchanger 8 is led to mixture gas preheater 10 by way of heating outlet pipe 17 of intermediate heat exchanger 8. It is then used to exchange heat in the mixture gas preheater 10 and subsequently led to the low-pressure turbine 26 to drive the low-pressure turbine 26 along with the steam directly transferred from the high pressure turbine 24.

In the hydrogen production plant 23, the raw material (mixture gas of methanol, ethanol or dimethylether and steam) is heated by the mixture gas preheater 10 and processed to produce hydrogen by the reformer 9. Since the gas generated in the reformer 9 contains gaseous substances other than hydrogen, only hydrogen is separated by a hydrogen separator 14.

In the above-described known electric power generation/hydrogen production combination plant, the heat of the steam produced by the steam generator 1 of the electric power generation system, is transmitted to the intermediate loop 19 by way of the intermediate heat exchanger 8. When heating the reformer 9 of the hydrogen generation plant 23 by way of the intermediate loop 19, it is necessary to efficiently transmit heat in the reformer 9 in order to utilize steam for power generation as much as possible. For this purpose, it is effective to use water having a large specific heat as thermal medium for the intermediate loop 19 and exploits the heat produced when such water is condensed.

As an example, if the thermal conductivity of saturated steam and that of superheated steam are compared at 250° C., the amount of heat that is generated when 1 kg of saturated steam is condensed is 1,715 kJ, whereas the amount of heat that is generated by 1 kg of superheated steam as a result of a temperature change is only about 1,340 kJ if the temperature change is a very large fall of temperature from 800° C. to 250° C.

However, collection of waste heat is not considered sufficiently for known electric power generation/hydrogen production combination plants. While some known electric power generation/hydrogen production combination plants are equipped with a thermal medium circulation means, no established specific means is available to date for the purpose of transmission of heat.

If the steam generated in a steam generation plant is saturated steam as in the case of light water nuclear reactors (including boiling water reactors and pressurized water reactors) that are used in the commercial nuclear power generation plants and it is used for heating in the intermediate heat exchanger, the steam is condensed to become liquid water without fail.

However, in known electric power generation/hydrogen production combination plants, the water produced by condensation in intermediate heat exchangers is not considered properly and the heating outlet pipes of intermediate heat exchangers are connected to the respective turbine inlets. With this arrangement, the water produced by condensation in the intermediate heat exchangers is forced to flow into the turbines to consequently give rise to problems including a reduced operation efficiency of the turbines and erosion of the internal structures of the turbines.

Additionally, if the steam generated in the steam generation plant is superheated steam as in the case of fast-breeder reactors and high temperature gas-cooled reactor and even in the case of the boilers of thermal power plants, which also produce superheated steam, it is effective to utilize the heat produced as a result of condensation in the intermediate heat exchangers when utilizing steam for power generation as much as possible. In such situations again, liquid water is produced by condensation to consequently give rise to problems including a reduced operation efficiency of the turbines and erosion of the internal structures of the turbines when the water produced by condensation is led to the turbines.

SUMMARY OF THE INVENTION

In view of the above-identified problems, it is therefore an object of the present invention to provide an electric power generation/hydrogen production combination plant that can efficiently transmit the heat of the steam produced in the steam generation plant of the electric power generation system thereof to the reformer of the hydrogen production plant and appropriately process the condensed water produced by condensing the steam utilized for heating in the intermediate heat exchanger in order to suppress the fall of the operation efficiency of the turbines and the erosion of the internal structures of the turbines.

To achieve the above object, one aspect of the present invention is to provide an electric power generation/hydrogen production combination plant that comprises a steam generation plant, a turbine for generating electric power using steam generated by the steam generation plant, a condenser for condensing the steam exhausted from the turbine, a feed water pump for circulating the condensed water condensed by the condenser to the steam generation plant, a feed water heater arranged upstream relative to the feed water pump to heat feed water, a reformer for producing formation gas containing hydrogen by processing methanol, ethanol or dimethylether using steam, a hydrogen separator for separating high purity hydrogen from the produced formation gas, an intermediate loop for circulating a thermal medium in order to supply the heat generated by the steam generation plant to the reformer, an intermediate heat exchanger for transmitting the heat of the steam to the intermediate loop, a heating inlet pipe of intermediate heat exchanger connected to the heating inlet of the intermediate heat exchanger to supply steam from the steam generation plant, and a heating outlet pipe of intermediate heat exchanger connected to the heating outlet of the intermediate heat exchanger and the feed water heater to heat feed water.

Another aspect of the present invention is to provide an electric power generation/hydrogen production combination plant that comprises a steam generation plant, a turbine for generating electric power using steam generated by the steam generation plant, a condenser for condensing the steam exhausted from the turbine, a feed water pump for circulating the condensed water condensed by the condenser to the steam generation plant, a feed water heater arranged upstream relative to the feed water pump to heat feed water, a reformer for producing mixture gas containing hydrogen by processing methanol, ethanol or dimethylether using steam, a hydrogen separator for separating high purity hydrogen from the produced mixture gas, a main steam branch pipe for branching part of the steam introduced into the turbine and circulating the part of the steam so as to supply it to the reformer, and a heating outlet pipe connected to the heating outlet of the reformer and the feed water heater to heat feed water. Thus, with an electric power generation/hydrogen production combination plant according to the present invention, it is possible to suppress the fall of the operation efficiency of the turbines and the erosion of the internal structures of the turbines by efficiently transmitting the heat of the steam produced in the steam generation plant of the electric power generation system thereof to the reformer of the hydrogen production plant and appropriately processing the condensed water produced by condensing the steam utilized for heating in the intermediate heat exchanger.

DETAILED DESCRIPTION OF THE INVENTION

Now, embodiments of electric power generation/hydrogen production combination plant according to the present invention will be described in greater detail by referring to the accompanying drawings. Throughout the drawings, the components that are the same or similar to each other are denoted by the same reflectance symbol and would not be described any further.

Figure 1:
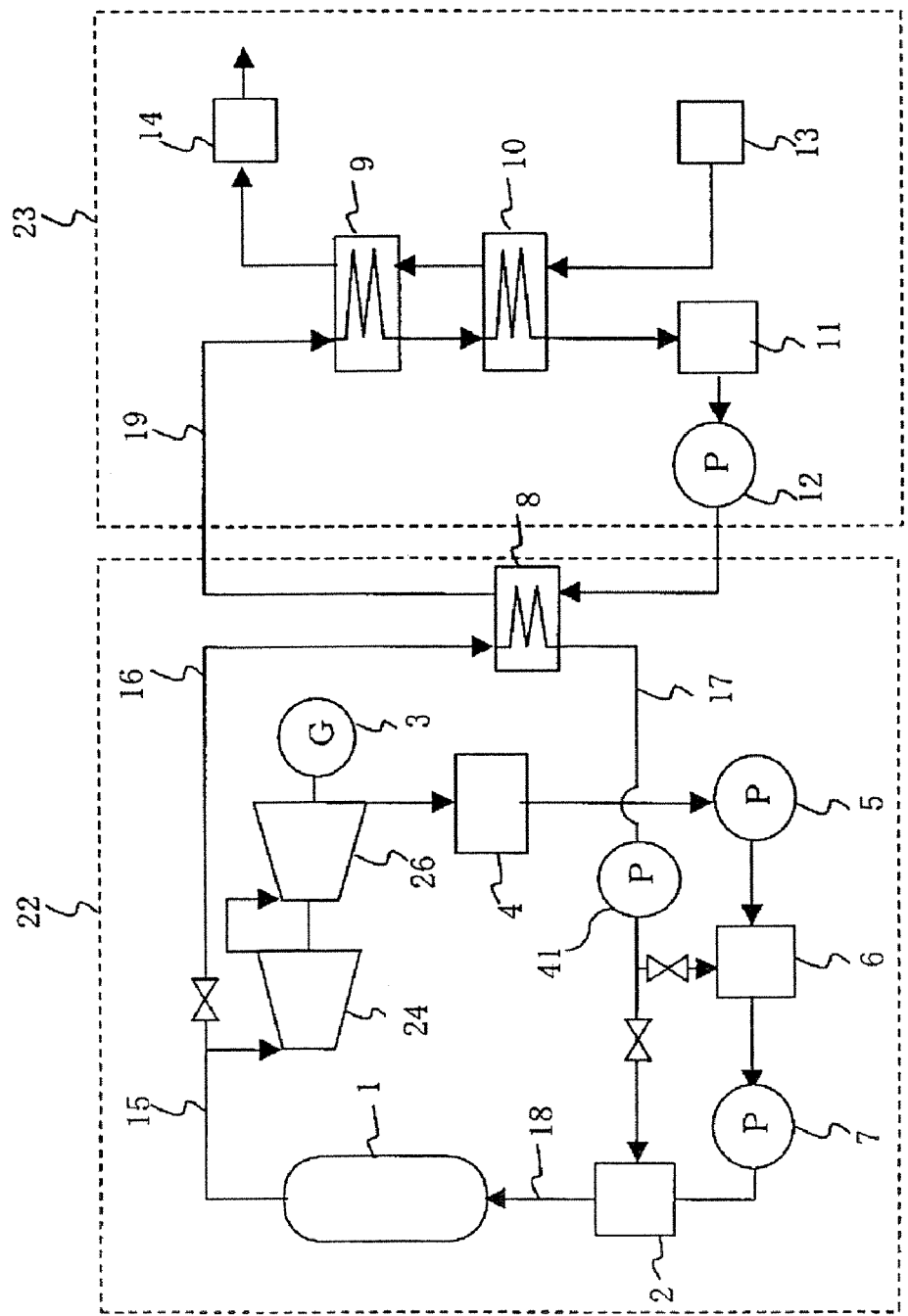
FIG. 1 is a schematic block diagram of a first embodiment of electric power generation/hydrogen production combination plant according to the invention, illustrating the configuration thereof.

FIG. 1 is a schematic block diagram of a first embodiment of electric power generation/hydrogen production combination plant according to the invention, illustrating the configuration thereof.

In this embodiment, a boiling water reactor is used as the steam generator 1 of an electric power generation system 22. The steam produced from the steam generator 1 is supplied to a high-pressure turbine 24 by way of a main steam pipe 15 to drive the high-pressure turbine 24 to rotate. After driving the high-pressure turbine 24 to rotate, the steam is then led to a low-pressure turbine 26 to drive by turn the low-pressure turbine 26. The shaft of the high-pressure turbine 24 and that of the low-pressure turbine 26 are directly linked to the shaft of the generator 3 so that the generator 3 is driven to rotate and generate electric power.

The steam that has worked in the high-pressure and low-pressure turbines 24, 26 is transferred to a condenser 4 and condensed back to liquid water by a condenser 4. The pressure of the condensed water is raised by the condenser pump 5. Then, the water is heated by a low-pressure feed water heater 6 and its pressure is raised further by a feed water pump 7. Thereafter, the water is heated by a high-pressure feed water heater 2 and returned to the steam generation plant 1 by a feed water pipe 18 to circulate. In actual plant, the some high-pressure feed water heaters 2, the some condenser pumps 5, the some low-pressure feed water heaters 6 and the some feed water pumps 7 are arranged, according to the size of plant. The feed water heaters 2, 6 are arranged upstream and downstream relative to the feed water pump 7 to heat feed water.

The steam that is produced by the steam generator 1 is partly branched from main steam pipe 15 by operating a transfer valve, a switch valve or the like, when necessary, and transferred to an intermediate heat exchanger 8 by way of heating inlet pipe 16 of intermediate heat exchanger 8. As the intermediate heat exchanger 8 operates to exchange heat, the water in intermediate loop 19 is transformed to saturated steam. Heating outlet pipe 17 of intermediate heat exchanger 8 is connected to a high-pressure feed water heater 2 in the electric power generation system 22. The water condensed in the intermediate heat exchanger 8 or the mixtures of the condensed water and uncondensed steam is transferred to the high pressure feed water heater 2 and used to heat feed water. It may alternatively be so arranged that the heating outlet pipe 17 of intermediate heat exchanger 8 is connected to a low-pressure feed water heater 6 as a transfer valve, a switch valve or the like is operated according to the temperature of the steam led from it. It may be needless to say that the heating outlet pipe 17 can be connected only to the low pressure feed water heater 6 or the high-pressure feed water heater 2. Furthermore, depending on the plant, it is also possible to arrange a pump 41 at the heating outlet pipe 17 of intermediate heat exchanger 8 and transfer the water condensed in the intermediate heat exchanger 8 or the mixtures of the condensed water and uncondensed steam to the high pressure feed water heater 2 under high pressure.

In the above-described intermediate loop 19, the saturated steam produced by the intermediate heat exchanger 8 is transferred to a reformer 9. Formation gas containing hydrogen and carbon dioxide as two principal ingredients is prepared from a mixture of methanol, ethanol or dimethylether and steam in the reformer 9. Since this chemical reaction is an endothermic reaction, heat needs to be supplied externally in order to cause the reaction to proceed continuously. Heat can be supplied by condensing the steam transferred from the intermediate heat exchanger 8.

A mixture gas preheater 10 is arranged at the outlet side of the reformer 9 of the intermediate loop 19. The mixture gas preheater 10 is designed to utilize the waste heat of the water condensed by the reformer 9 or the mixture of the condensed water and uncondensed steam as heat source for the mixture gas of methanol, ethanol or dimethylether and steam that is to be used as raw material gas. The water that is produced by condensation and cooled in the mixture gas preheater 10 is accumulated in a drain tank 11 and then circulated back to the intermediate heat exchanger 8 by means of a circulation pump 12 so as to be transformed into saturated steam once again.

In the hydrogen production plant 23 of the embodiment having the configuration as described above, the mixture gas of the raw material of methanol, ethanol or dimethylether and steam is transferred from a raw material feeder 13 to the reformer 9 by way of the mixture gas preheater 10. The mixture gas is then heated and subjected to a chemical reaction that utilizes the effect of a catalyst in the reformer 9 to produce a formation gas that contains hydrogen and carbon dioxide as two principal ingredients. Thus, it is possible to produce high purity hydrogen as only hydrogen is extracted from the produced formation gas by a hydrogen separator 14.

Thus, with this embodiment, the steam generated by the steam generator 1 is utilized for heating by the intermediate heat exchanger 8 and the condensed water is supplied to the high-pressure feed water heater 2 and utilized as heat source by the latter so that it is possible to remarkably suppress the fall of the operation efficiency of the turbines and the erosion of the internal structures of the turbines due to the influx of the condensed water into the turbines.

Since the intermediate heat exchanger 8 is designed to utilize latent heat that is generated by a phase change from steam (gas) to water (liquid), it is possible to minimize the flow rate of steam branched for heating the intermediate heat exchanger 8 and maximize the flow rate of steam fed to the high pressure turbine 24 for the purpose of electric power generation. Additionally, since latent heat that is generated by a phase change of a substance from steam to liquid water or vice versa is utilized in the intermediate loop 19, it is possible to efficiently transfer the heat collected by the intermediate heat exchanger 8 to the reformer 9 by transmission of condensation heat.

In this way, the heat of the steam generated by the steam generator 1, which is a boiling water reactor, is efficiently transmitted to the reformer 9 of the hydrogen production plant 23 by means of the intermediate loop 19 and the condensed water that is produced as a result of utilization of steam by the intermediate heat exchanger 8 is supplied to the high pressure feed water heater 2 so that it is possible to remarkably suppress the fall of the operation efficiency of the turbines and the erosion of the internal structures of the turbines due to the influx of the condensed water into the turbines.

Figure 2:
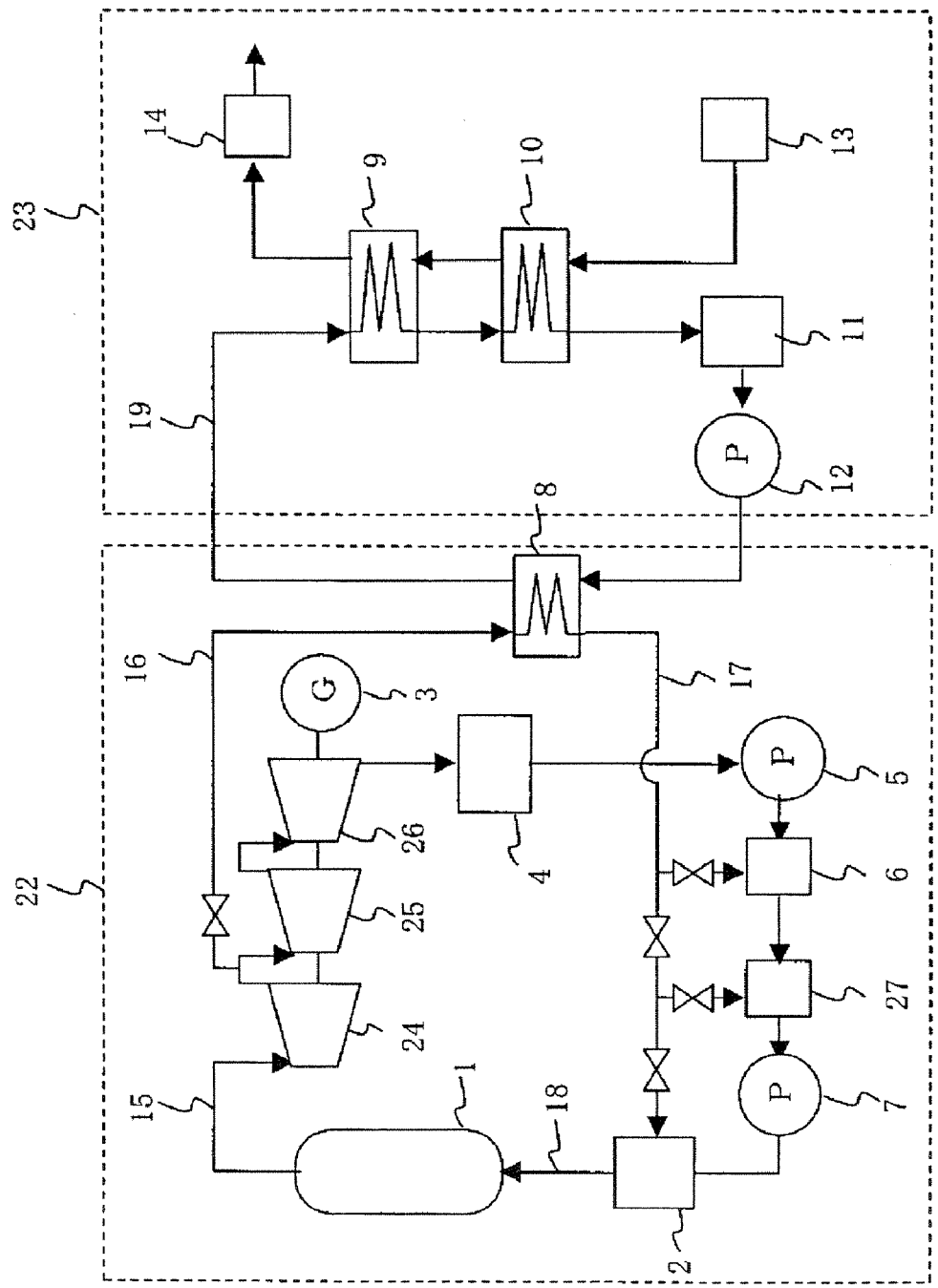
FIG. 2 is a schematic block diagram of a second embodiment of electric power generation/hydrogen production combination plant according to the invention, illustrating the configuration thereof.

FIG. 2 is a schematic block diagram of a second embodiment of electric power generation/hydrogen production combination plant according to the invention, illustrating the configuration thereof.

In this embodiment, a supercritical water cooled reactor is used as the steam generator 1 of the electric power generation system 22 instead of the boiling water reactor of the first embodiment. The components of the second embodiment same as or similar to those of the first embodiment are denoted respectively by the same reference symbols and will not be described any further.

In this embodiment, a supercritical water cooled reactor is installed as the steam generator 1 of the electric power generation system 22. The steam in a supercritically pressurized condition that is generated by the steam generator 1 is supplied to the high pressure turbine 24 and drives the latter to rotate. After driving the high pressure turbine 24 to rotate, the steam further drives an intermediate pressure turbine 25 and then the low-pressure turbine 26 in order to generate electric power by means of the generator 3. The steam that has worked in the high pressure, intermediate pressure and low pressure turbines 24, 25, 26 is transferred to a condenser 4 and condensed back to water. Thereafter, the water is heated to become hot by a condenser pump 5 by way of a low pressure feed water heater 6 and returned to the steam generator 1 by way of a de-aerator 27 by a feed water pump 7 to circulate.

The steam is partly branched from between the high-pressure turbine 24 and the intermediate pressure turbine 25 and transferred to an intermediate heat exchanger 8. Note, however, that the steam may be branched from the upstream of the high-pressure turbine 24 or any of the steps in the high-pressure turbine 24. The heating outlet pipe 17 of intermediate heat exchanger 8 is connected to high pressure feed water heater 2 of the electric power generation system 22. Part or all of the steam that is used in the intermediate heat exchanger 8 for exchanging heat is condensed and transferred to the high pressure feed water heater 2 so as to be used for heating feed water. Note that the heating outlet pipe 17 of intermediate heat exchanger 8 may be connected to the de-aerator 27 or the low pressure feed water heater 6 when necessary according to the steam pressure and/or temperature.

In this way, the heat of the steam generated by the steam generator 1, which is a supercritical water cooled reactor, is efficiently transmitted to the reformer 9 of the hydrogen production plant 23 by means of the intermediate loop 19 and the condensed water that is produced as a result of utilization of steam by the intermediate heat exchanger 8 is supplied to the high pressure feed water heater 2 so that it is possible to remarkably suppress the fall of the operation efficiency of the turbines and the erosion of the internal structures of the turbines due to the influx of the condensed water into the turbines.

Figure 3:
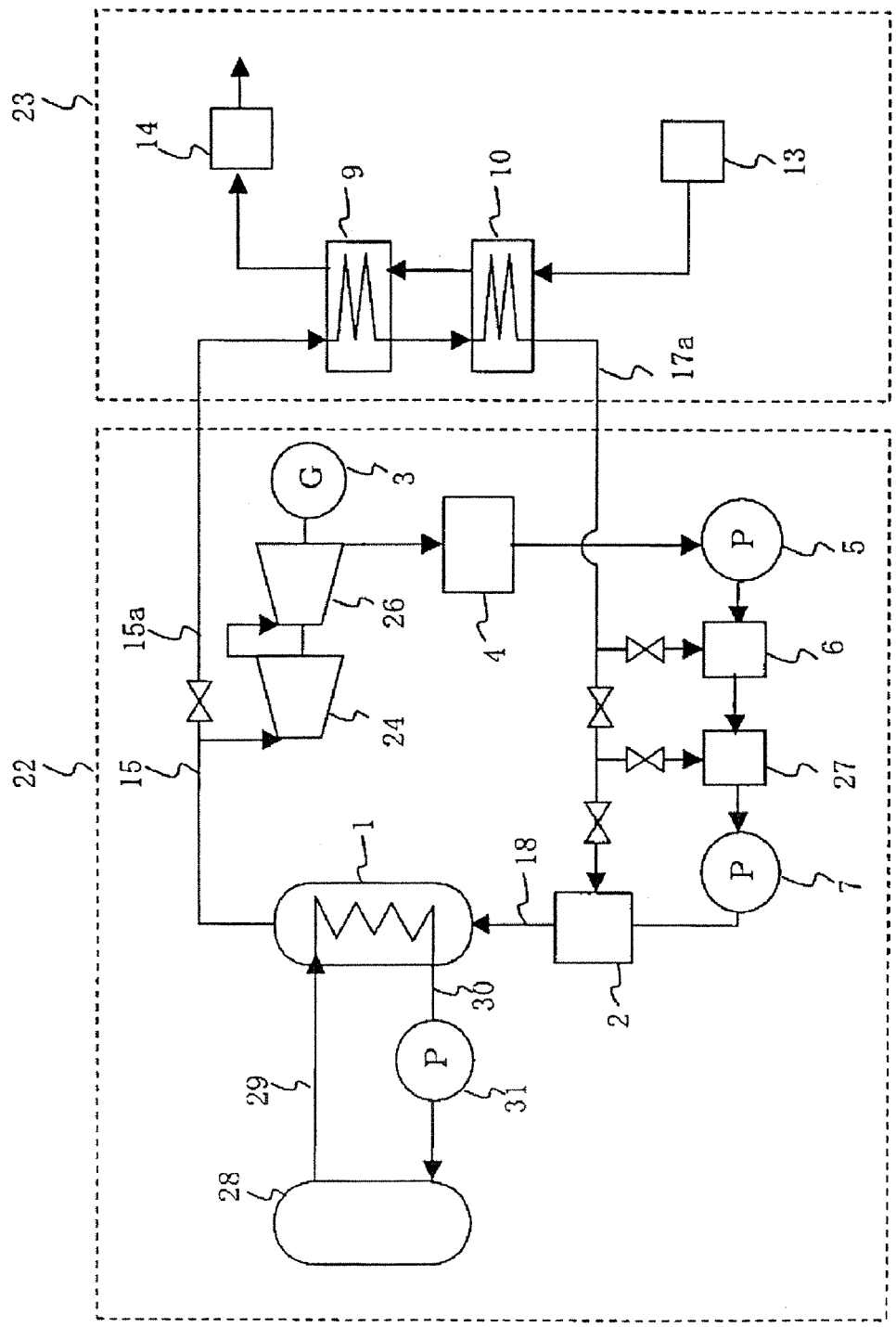
FIG. 3 is a schematic block diagram of a third embodiment of electric power generation/hydrogen production combination plant according to the invention, illustrating the configuration thereof.

FIG. 3 is a schematic block diagram of a third embodiment of electric power generation/hydrogen production combination plant according to the invention, illustrating the configuration thereof.

In this embodiment, a pressurized water reactor is used as the steam generator 1 of the electric power generation system 22 instead of the boiling water reactor of the first embodiment. The components of the third embodiment same as or similar to those of the first embodiment are denoted respectively by the same reference symbols and will not be described any further.

As shown in FIG. 3, the steam generator and the nuclear reactor pressure vessel are installed as the steam generator 1 of the electric power generation system 22. The steam generated from the boiling water reactor of the first embodiment and the supercritical water cooled reactor of the second embodiment contains one or more than one radioactive substances. On the other hand, the steam generated from the steam generator of the third embodiment does not contain any radioactive substance. Therefore, an intermediate loop 19 is arranged so that any radioactive substances may not flow into the hydrogen production plant 23 when transmitting heat to the reformer 9 in the first and second embodiments. However, such an intermediate loop 19 is not required when the steam generator is used as the steam generator 1.

The above-described nuclear reactor pressure vessel 28 and the steam generator 1 are linked to each other by a cold leg 30, through which cold water flows if compared with a hot leg 29 through which hot water flow, to form a circulation loop. The water in the circulation loop is pressurized so as not to boil and forced to circulate by a primary coolant circulation pump 31 so that the heat generated from the nuclear reactor pressure vessel 28 is transmitted to the steam generator 1.

The steam that is produced from the steam generator 1 is partly branched from main steam pipe 15 by operating a valve, when necessary, and transferred to the reformer 9 of the hydrogen production plant 23 by way of a main steam branch pipe 15*a*. A mixture gas preheater 10 is arranged at the outlet side of the reformer 9. The mixture gas preheater 10 is designed to utilize the waste heat of the water condensed by the reformer 9 or the mixture of the condensed water and uncondensed steam as heat source for the mixture gas of methanol, ethanol or dimethylether and steam that is to be used as raw material gas.

The heating outlet pipe 17*a* of the mixture gas preheater 10 is connected to the high pressure feed water heater 2, which heats the water supplied to it, utilizing the heat of the water condensed by the mixture gas preheater 10. Note that the heating outlet pipe 17*a* of the mixture gas preheater 10 may be connected to the de-aerator 27 or the low pressure feed water heater 6 when necessary according to the steam pressure and/or temperature.

The steam generator of a fast-breeder reactor or that of a high temperature gas-cooled reactor may be installed as the steam generator 1.

Thus, in this embodiment, the heat of the steam generated by the steam generator 1, which is the steam generator of a pressurized water reactor, is efficiently transmitted to the reformer 9 and the condensed water is supplied to the high pressure feed water heater 2 so that it is possible to remarkably suppress the fall of the operation efficiency of the turbines and the erosion of the internal structures of the turbines due to the influx of the condensed water into the turbines.

Additionally, since the reformer 9 is designed to utilize latent heat that is generated by a phase change from steam to water, it is possible to minimize the flow rate of steam branched for heating reformer 9 and maximize the flow rate of steam fed to the high pressure turbine 24 for the purpose of electric power generation.

As described above, the heat of the steam generated by the steam generator 1 of the electric power generation plant 22 is efficiently transmitted to the reformer 9 of the hydrogen production plant 23 and the reformer 9 appropriately process the steam that is used for the purpose of heating so that it is possible to remarkably suppress the fall of the operation efficiency of the turbines and the erosion of the internal structures of the turbines due to the influx of the condensed water into the turbines.

Figure 4:
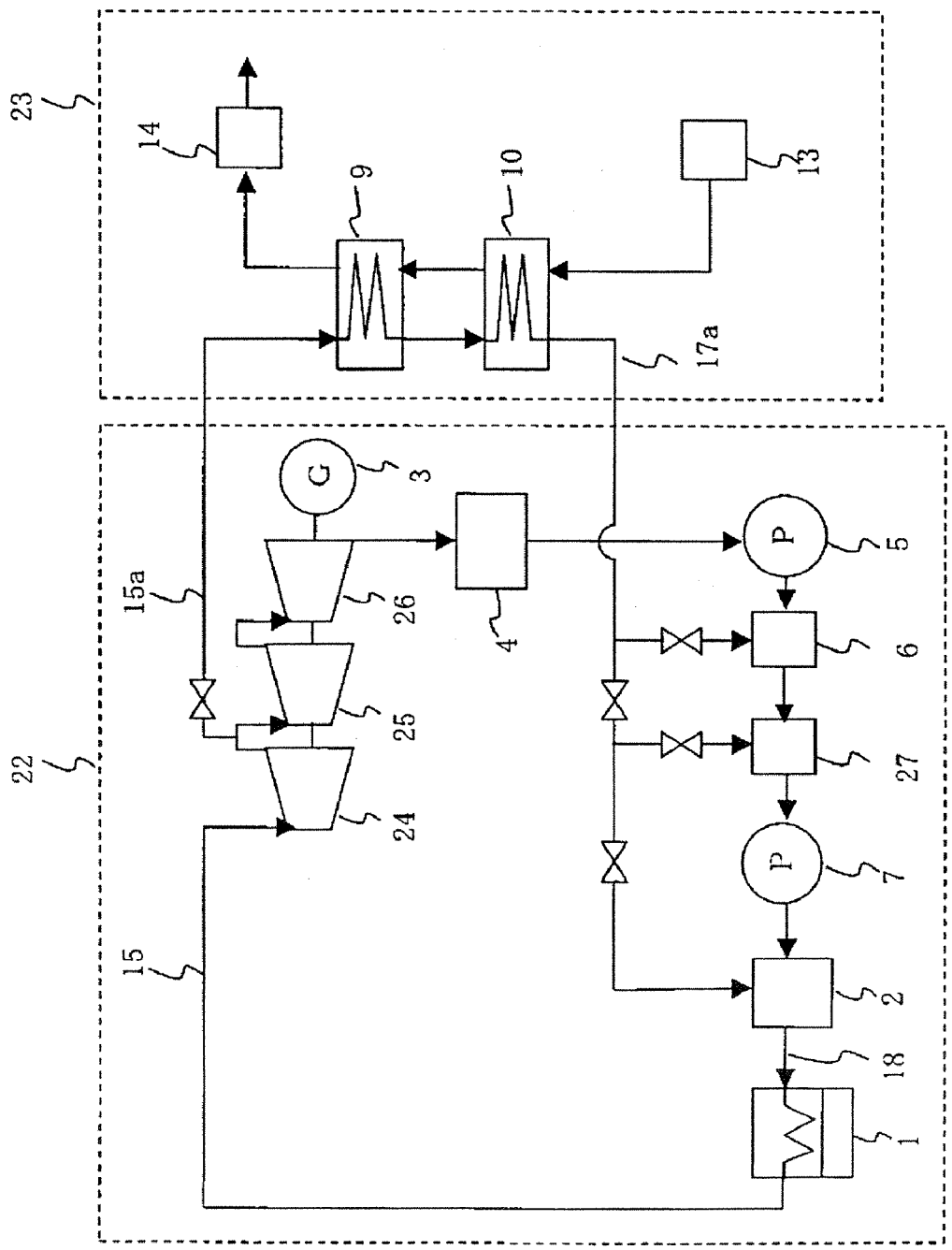
FIG. 4 is a schematic block diagram of a fourth embodiment of electric power generation/hydrogen production combination plant according to the invention, illustrating the configuration thereof.
Figure 5:
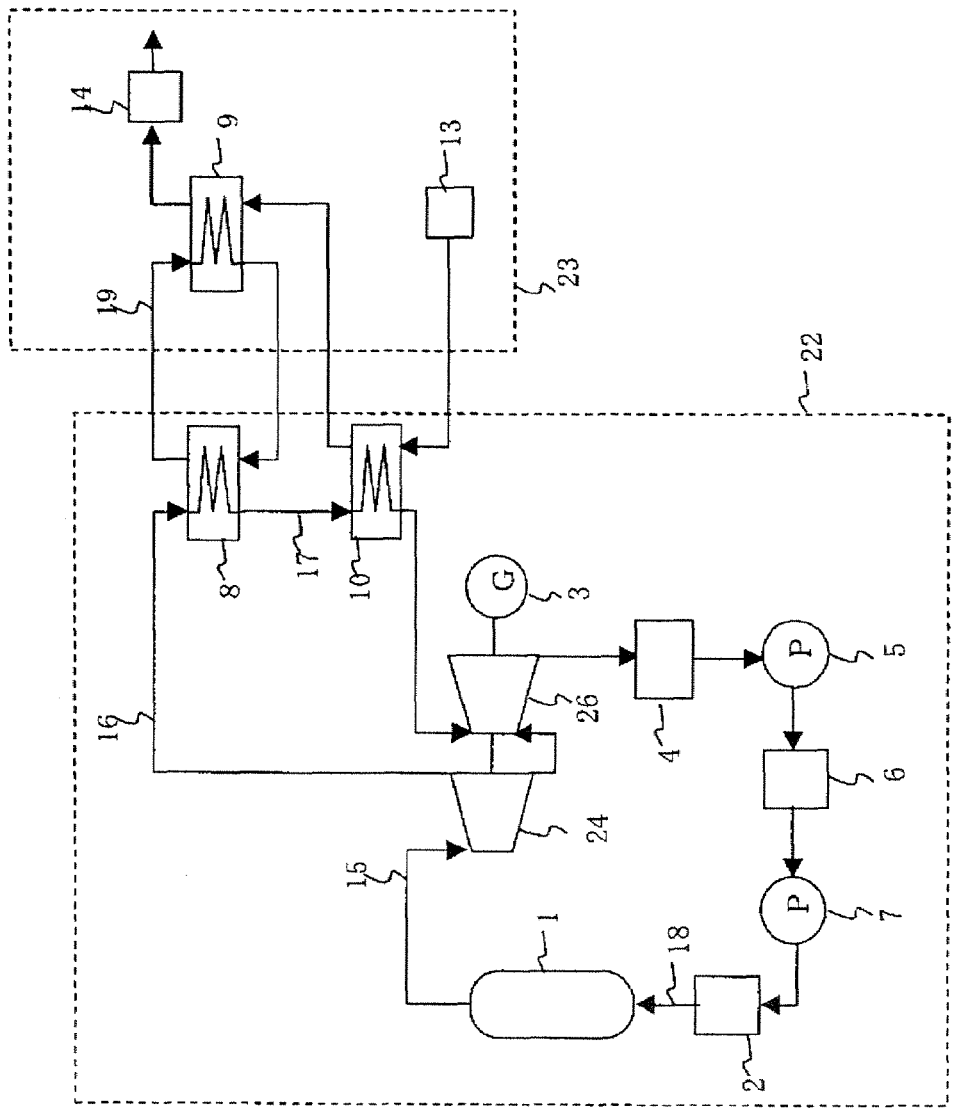
FIG. 5 is a schematic block diagram of a known electric power generation/hydrogen production combination plant, illustrating the configuration thereof.

FIG. 4 is a schematic block diagram of a fourth embodiment of electric power generation/hydrogen production combination plant according to the invention, illustrating the configuration thereof.

In this embodiment, a thermal power boiler is arranged as the steam generator 1 of the electric power generation system 22 of the first embodiment. The components of the fourth embodiment same as or similar to those of the first embodiment are denoted respectively by the same reference symbols and will not be described any further.

As shown in FIG. 4, a thermal power boiler is installed as the steam generator 1 of the electric power generation system 22. Again, no intermediate loop is required in this embodiment since the steam produced by the thermal power boiler does not contain any radioactive substance.

Part of the steam transferred from a high pressure turbine 24 to an intermediate pressure turbine 25 is branched and transferred to the reformer 9 of the hydrogen production plant 23 so as to be utilized for heat exchange. A mixture gas preheater 10 is arranged at the outlet side of the reformer 9.

The heat of the water condensed by the reformer 9 or that of the mixture of the condensed water and uncondensed steam is utilized as heat source for the mixture gas of methanol, ethanol or dimethylether and steam that is to be used as raw material gas.

The heating outlet pipe 17*a* of the mixture gas preheater 10 is connected to a high pressure feed water heater 2 so that feed water is heated by the heat of the water condensed by the mixture gas preheater 10. The heating outlet pipe 17*a* of the mixture gas preheater 10 may be connected to an de-aerator 27 or a low pressure feed water heater 6 by way of a valve when necessary according to the steam pressure and/or temperature.

Thus, in this embodiment, the heat of the steam generated by the steam generator 1, which is a thermal power boiler, is efficiently transmitted to the reformer 9 of the hydrogen production plant 23 by the intermediate loop 19 and the water condensed as a result of utilizing by the intermediate heat exchanger 8 for the purpose of heating is supplied to the high pressure feed water heater 2 so that it is possible to remarkably suppress the fall of the operation efficiency of the turbines and the erosion of the internal structures of the turbines.

The present invention is by no means limited to the above-described embodiments, which may be modified in various different ways without departing from the scope of the present invention. For example, a coal plant may be used for the steam generator.

What is claimed is:

1. An electric power generation/hydrogen production combination plant, comprising:
   a steam generator;
   a turbine for generating electric power, using steam generated by the steam generator;
   a condenser for condensing the steam exhausted from the turbine;
   a feed water pump and a condenser pump for circulating the condensed water condensed by the condenser to the steam generator via a feed water pipe;
   feed water heaters arranged upstream and downstream relative to the feed water pump, and downstream of the condenser pump on the feed water pipe, so as to heat feed water to be supplied to the steam generator;
a reformer for producing product gas containing hydrogen by processing at least one raw material selected from the group consisting of methanol, ethanol and dimethylether, using steam;
a hydrogen separator for separating high purity hydrogen from the product gas;
an intermediate loop for circulating a thermal medium in order to supply the heat generated by the steam generator to the reformer;
an intermediate heat exchanger for transmitting heat of the steam to the intermediate loop;
a heating inlet pipe of the intermediate heat exchanger connected to a heating inlet of the intermediate heat exchanger to supply steam from the steam generator; and
heating outlet pipes of the intermediate heat exchanger for connecting a heating outlet of the intermediate heat exchanger and the feed water heaters.

2. The plant according to claim 1, wherein the intermediate loop circulates water as a thermal medium, transforms water into steam by means of the intermediate heat exchanger, and transmits heat.

3. The plant according to claim 1, further comprising: a mixture gas preheater arranged downstream relative to the reformer so as to preheat mixture gas of at least one raw material selected from the group consisting of methanol, ethanol and dimethylether, and steam to be used as raw material by means of the heat collected by the reformer.

4. The plant according to claim 1, wherein the steam generator is a boiler selected from the group consisting of a boiling water reactor and a supercritical water cooled reactor.

5. An electric power generation/hydrogen production combination plant, comprising:
a steam generator;
a turbine for generating electric power, using steam generated by the steam generator;
a condenser for condensing the steam exhausted from the turbine;
a feed water pump and a condenser pump for circulating the condensed water condensed by the condenser to the steam generator via a feed water pipe;
feed water heaters arranged upstream and downstream relative to the feed water pump, and downstream of the condenser pump on the feed water pipe, so as to heat feed water to be supplied to the steam generator;
a reformer for generating mixture gas containing hydrogen by processing at least one raw material selected from the group consisting of methanol, ethanol and dimethylether, using steam;
a hydrogen separator for separating high purity hydrogen from the mixture gas;
a main steam branch pipe for branching part of the steam introduced into the turbine and circulating the part of the steam so as to supply it to the reformer; and
heating outlet pipes of the reformer for connecting a heating outlet of the reformer and the feed water heaters.

6. The plant according to claim 5, further comprising: a mixture gas preheater arranged downstream relative to the reformer so as to preheat mixture gas of at least one raw material selected from the group consisting of methanol, ethanol and dimethylether, and steam to be used as raw material by means of the heat collected by the reformer.

7. The plant according to claim 5, wherein the steam generator is a boiler selected from the group consisting of a steam generator of a pressurized water nuclear reactor, that of a fast-breeder reactor, that of a high temperature gas-cooled reactor and that of a fossil fuel burning boiler.

8. The plant according to claim 1, wherein the heating outlet pipes of the intermediate heat exchanger are arranged to bypass the turbine.

9. The plant according to claim 5, wherein the heating outlet pipes of the reformer are arranged to bypass the turbine.

10. An electric power generation/hydrogen production combination plant, comprising:
a steam generator;
a turbine configured to generate electric power, using steam generated by the steam generator;
a condenser configured to condense the steam exhausted from the turbine;
a feed water pump and a condenser pump configured to circulate the condensed water condensed by the condenser to the steam generator via a feed water pipe;
feed water heaters arranged upstream and downstream relative to the feed water pump, and downstream of the condenser pump on the feed water pipe, configured to heat feed water to be supplied to the steam generator;
a reformer configured to produce product gas containing hydrogen by processing at least one raw material selected from the group consisting of methanol, ethanol and dimethylether, using steam;
a hydrogen separator configured to separate high purity hydrogen from the product gas;
an intermediate loop configured to circulate a thermal medium in order to supply heat generated by the steam generator to the reformer;
an intermediate heat exchanger configured to transmit the heat of the steam to the intermediate loop;
a heating inlet pipe of the intermediate heat exchanger connected to the heating inlet of the intermediate heat exchanger configured to supply steam from the steam generator; and
heating outlet pipes of the intermediate heat exchanger configured to connect to a heating outlet of the intermediate heat exchanger and the feed water heaters.

11. The plant according to claim 10, wherein the intermediate loop circulates water as a thermal medium, transforms water into steam by means of the intermediate heat exchanger, and transmits heat.

12. The plant according to claim 10, further comprising: a mixture gas preheater arranged downstream relative to the reformer configured to preheat mixture gas of at least one raw material selected from the group consisting of methanol, ethanol and dimethylether, and steam to be used as raw material by means of the heat collected by the reformer.

13. The plant according to claim 10, wherein the steam generator is a boiler selected from the group consisting of a boiling water reactor and a supercritical water cooled reactor.

14. The plant according to claim 10, wherein the heating outlet pipes of the intermediate heat exchanger are arranged to bypass the turbine.

15. An electric power generation/hydrogen production combination plant, comprising:
a steam generator;
a turbine configured to generate electric power, using steam generated by the steam generator;
a condenser configured to condense the steam exhausted from the turbine;
a feed water pump and a condenser pump configured to circulate the condensed water condensed by the condenser to the steam generator via a feed water pipe;
feed water heaters arranged upstream and downstream relative to the feed water pump, and downstream of the condenser pump on the feed water pipe, configured to heat feed water to be supplied to the steam generator;

a reformer configured to produce product gas containing hydrogen by processing at least one raw material selected from the group consisting of methanol, ethanol and dimethylether, using steam;

a hydrogen separator configured to separate high purity hydrogen from the product gas;

a main steam branch pipe configured to branch part of the steam introduced into the turbine and circulating the part of the steam so as to supply it to the reformer; and heating outlet pipes of the reformer configured to connect a heating outlet of the reformer and the feed water heaters.

16. The plant according to claim 15, further comprising: a mixture gas preheater arranged downstream relative to the reformer configured to preheat mixture gas of at least one raw material selected from the group consisting of methanol, ethanol and dimethylether, and steam to be used as raw material by means of the heat collected by the reformer.

17. The plant according to claim 15, wherein the steam generator is a boiler selected from the group consisting of a steam generator of a pressurized water nuclear reactor, that of a fast-breeder reactor, that of a high temperature gas-cooled reactor and that of a fossil fuel burning boiler.

18. The plant according to claim 15, wherein the heating outlet pipes of the reformer are arranged to bypass the turbine.

* * * * *